(12) United States Patent
Bao et al.

(10) Patent No.: US 9,158,753 B2
(45) Date of Patent: Oct. 13, 2015

(54) DATA PROCESSING METHOD, PRESENTATION METHOD, AND CORRESPONDING APPARATUSES

(71) Applicant: International Business Machines Corporation, Armonk, NY (US)

(72) Inventors: Sheng Hua Bao, Yorktown Heights, NY (US); Jian Chen, Beijing (CN); Wen Liu, Beijing (CN); Yong Qin, Beijing (CN); Qin Shi, Beijing (CN); Zhong Su, Beijing (CN); Shi Lei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/943,308

(22) Filed: Jul. 16, 2013

(65) Prior Publication Data

US 2014/0019121 A1    Jan. 16, 2014

Related U.S. Application Data

(63) Continuation of application No. 13/924,832, filed on Jun. 24, 2013.

(30) Foreign Application Priority Data

Jul. 12, 2012 (CN) .......................... 2012 1 0241787

(51) Int. Cl.
*G10L 15/18* (2013.01)
*G06F 17/27* (2006.01)
(Continued)

(52) U.S. Cl.
CPC ............ *G06F 17/27* (2013.01); *G06F 17/2765* (2013.01); *G10L 15/18* (2013.01); *G10L 15/187* (2013.01); *G10L 15/22* (2013.01)

(58) Field of Classification Search
CPC ..... G10L 15/22; G10L 15/187; G10L 15/183; G10L 15/24; G10L 15/114; G10L 15/1815; G10L 15/18; G10L 15/04; G10L 13/06; G10L 13/10; G06F 17/27; G06F 17/2785
USPC .............. 704/2–9, 270, 270.1, 257, 158, 235, 704/240, 251, 253, 255, 239, 238, 237, 704/243; 715/201, 245, 203, 256, 234; 381/88.01–88.04; 709/219, 206
See application file for complete search history.

(56) References Cited

U.S. PATENT DOCUMENTS 6,272,461 B1 * 8/2001 Meredith et al. ............... 704/235
7,516,415 B2 * 4/2009 Shimizu et al. ............... 715/780
(Continued)

OTHER PUBLICATIONS

J. Caminero, et al.,"On-line Garbage Modeling with Discriminant Analysis for Utterance Verification," In Proceedings of the international Conference on Spoken Language Processing, 1996, pp. 1-4.

*Primary Examiner* — Vijay B Chawan
(74) *Attorney, Agent, or Firm* — Cantor Colburn LLP; Gail Zarick

(57) ABSTRACT

A data processing method includes obtaining text information corresponding to a presented content, the presented content comprising a plurality of areas; performing text analysis on the text information to obtain a first keyword sequence, the first keyword sequence including area keywords associated with at least one area of the plurality of areas; obtaining speech information related to the presented content, the speech information at least comprising a current speech segment; and using a first model network to perform analysis on the current speech segment to determine the area corresponding to the current speech segment, wherein the first model network comprises the first keyword sequence.

10 Claims, 6 Drawing Sheets

(51) Int. Cl.
*G10L 15/22* (2006.01)
*G10L 15/187* (2013.01)

(56) References Cited

U.S. PATENT DOCUMENTS

| | | | |
|---|---|---|---|
| 7,549,120 B1* | 6/2009 | Griffith et al. | 715/234 |
| 7,725,318 B2* | 5/2010 | Gavalda et al. | 704/251 |
| 7,908,141 B2* | 3/2011 | Belknap | 704/235 |
| 8,457,959 B2* | 6/2013 | Kaiser | 704/231 |
| 8,504,351 B2* | 8/2013 | Waibel et al. | 704/2 |
| 8,712,776 B2* | 4/2014 | Bellegarda et al. | 704/260 |
| 2002/0099549 A1* | 7/2002 | Nguyen | 704/270 |
| 2004/0210433 A1* | 10/2004 | Elazar et al. | 703/24 |
| 2004/0210443 A1* | 10/2004 | Kuhn et al. | 704/276 |
| 2007/0106685 A1* | 5/2007 | Houh et al. | 707/102 |
| 2007/0283270 A1* | 12/2007 | Sand et al. | 715/727 |
| 2012/0143605 A1* | 6/2012 | Thorsen et al. | 704/235 |
| 2012/0303371 A1* | 11/2012 | Labsky et al. | 704/260 |
| 2012/0304057 A1* | 11/2012 | Labsky et al. | 715/256 |
| 2012/0310643 A1* | 12/2012 | Labsky et al. | 704/235 |
| 2013/0289987 A1* | 10/2013 | Ganapathiraju et al. | 704/236 |
| 2013/0307856 A1* | 11/2013 | Keane et al. | 345/473 |
| 2014/0067391 A1* | 3/2014 | Ganapathiraju et al. | 704/236 |
| 2014/0236600 A1* | 8/2014 | Lu et al. | 704/251 |

* cited by examiner

DATA PROCESSING METHOD, PRESENTATION METHOD, AND CORRESPONDING APPARATUSES

PRIORITY

This application is a continuation of U.S. patent application Ser. No.: 13/924,832, filed Jun. 24, 2013, which claims priority to Chinese Patent Application No. 201210241787.1, filed Jul. 12, 2012, and all the benefits accruing therefrom under 35 U.S.C. §119, the contents of which in its entirety are herein incorporated by reference.

BACKGROUND

The present invention relates to the field of speech recognition, and more specifically, to a data processing method, a presentation method, and corresponding apparatuses.

With continuous development of modern society, on more and more occasions, people often need to make a presentation to coordinate an explanation/speech so as to facilitate understanding of audiences/viewers or to attract their attention. For example, a salesman often needs to make a presentation via electronic slides, audio and video, etc., when introducing a product or a scheme to a client; a technician also uses these technical means to make a presentation when explaining a technical solution; and in remote teaching, a teacher relies more on these technical means to propagate information to students.

Nowadays, while people are making the above presentation, the presented content cannot automatically jump to the area corresponding to the current explanation along with the explanation of the presenter, i.e., the on-site explanation of the presenter cannot be associated with different areas of the presented content. It may require human intervention to jump between the different areas of the presented content, and thereby manpower costs for the presentation are increased. Further, the whole presentation is more easily interrupted so as to appear incoherent and disjointed.

Directed to the above drawbacks in the prior art, a technique is required to associate on-site speech information with the different areas of the presented content.

SUMMARY

In one embodiment, a data processing method includes obtaining text information corresponding to a presented content, the presented content comprising a plurality of areas; performing text analysis on the text information to obtain a first keyword sequence, the first keyword sequence including area keywords associated with at least one area of the plurality of areas; obtaining speech information related to the presented content, the speech information at least comprising a current speech segment; and using a first model network to perform analysis on the current speech segment to determine the area corresponding to the current speech segment, wherein the first model network comprises the first keyword sequence.

In another embodiment, an apparatus for data processing includes a text obtaining module configured to obtain text information corresponding to a presented content, the presented content comprising a plurality of areas; a text analysis module configured to perform text analysis on the text information to obtain a first keyword sequence, the first keyword sequence including area keywords associated with at least one area of the plurality of areas; a speech obtaining module configured to obtain speech information related to the presented content, the speech information at least comprising a current speech segment; a first speech analysis module configured to use a first model network to perform analysis on the current speech segment to determine the area corresponding to the current speech segment, wherein the first model network comprises the first keyword sequence.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
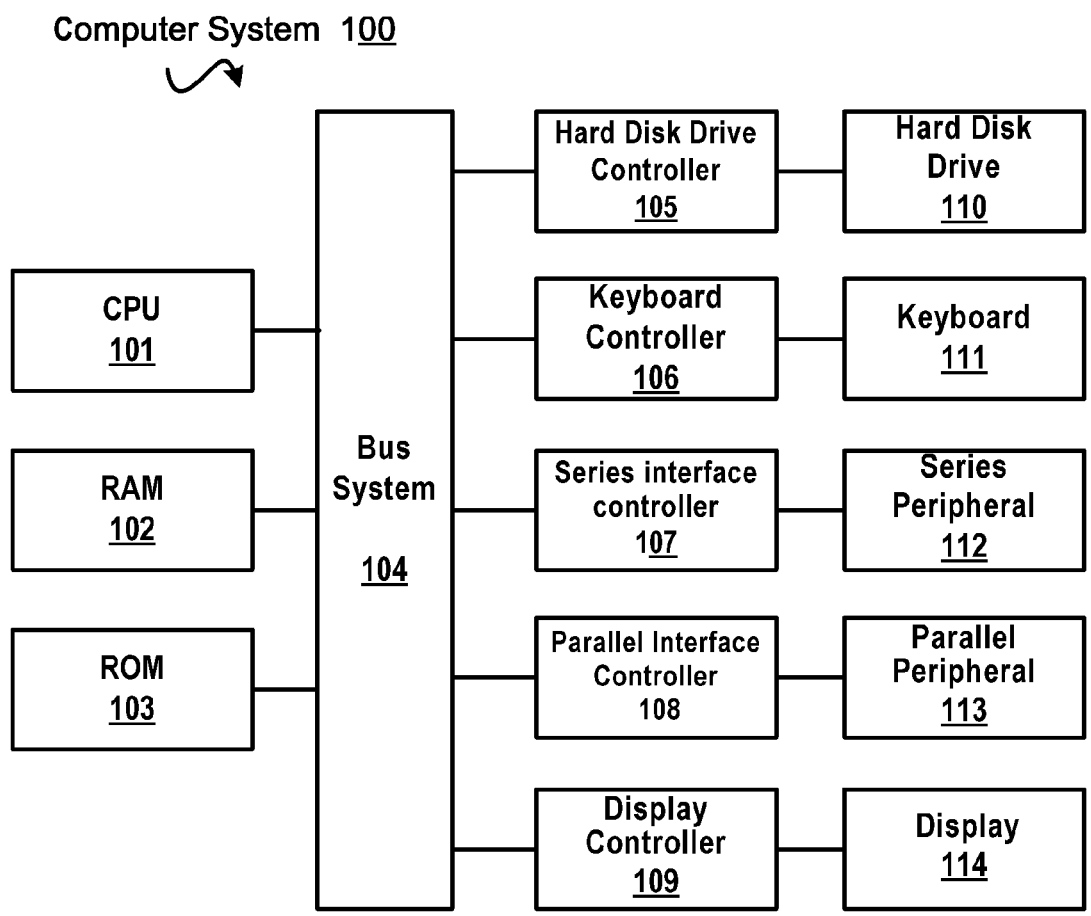
FIG. 1 shows an exemplary computer system which is applicable to implement the embodiments of the present invention.

In order to enable an association between speech information and a presented content, the present invention provides a data processing method, a presentation method, an apparatus for data processing, and an apparatus for presentation.

According to one aspect of the present invention, there is provided a data processing method, the method comprising: obtaining text information corresponding to a presented content, the presented content comprising a plurality of areas; performing text analysis on the text information to obtain a first keyword sequence, the first keyword sequence comprising area keywords associated with at least one area of the plurality of areas; obtaining speech information related to the presented content, the speech information at least comprising a current speech segment; using a first model network to perform analysis on the current speech segment to determine the area corresponding to the current speech segment, wherein the first model network comprises the first keyword sequence.

According to another aspect of the present invention, there is provided a presentation method, the method comprising: obtaining text information corresponding to a presented content, the presented content comprising a plurality of areas; performing text analysis on the text information to obtain a plurality of second keyword sequences, wherein at least one of the second keyword sequences corresponds to at least one area of the plurality of areas and at least one of the second keyword sequences comprises at least one keyword; obtaining speech information related to the presented content, the speech information at least comprising a current speech segment; obtaining a confidence degree of at least one keyword in at least one of the second keyword sequences, wherein the higher similarity a keyword has with respect to the current speech segment, the higher confidence degree is obtained for the keyword; obtaining the confidence degree of the second keyword sequence corresponding to the current area of the plurality of areas based on the confidence degree of the keyword; jumping away from the current area in response to the confidence degree of the second keyword sequence corresponding to the current area being less than a tenth threshold.

According to a further aspect of the present invention, there is provided an apparatus for data processing, the apparatus comprising: a text obtaining module configured to obtain text information corresponding to a presented content, the presented content comprising a plurality of areas; a text analysis module configured to perform text analysis on the text information to obtain a first keyword sequence, the first keyword sequence comprising area keywords associated with at least one area of the plurality of areas; a speech obtaining module configured to obtain speech information related to the presented content, the speech information at least comprising a current speech segment; a first speech analysis module configured to use a first model network to perform analysis on the current speech segment to determine the area corresponding to the current speech segment, wherein the first model network comprises the first keyword sequence.

According to a still further aspect of the present invention, there is provided an apparatus for presentation, the apparatus comprising: a text obtaining module configured to obtain text information corresponding to a presented content, the presented content comprising a plurality of areas; a text analysis module configured to perform text analysis on the text information to obtain a plurality of second keyword sequences, wherein at least one of the second keyword sequences corresponds to at least one area of the plurality of areas, and at least one of the second keyword sequences comprises at least one keyword; a speech obtaining module configured to obtain speech information related to the presented content, the speech information at least comprising a current speech segment; a first confidence module configured to obtain a confidence degree of at least one keyword in at least one of the second keyword sequences, wherein the higher similarity a keyword has with respect to the current speech segment, the higher confidence degree is obtained for the keyword; a second confidence module configured to obtain the confidence degree of the second keyword sequence corresponding to the current area of the plurality of areas based on the confidence degree of the keyword; a jump module configured to jump away from the current area in response to the confidence degree of the second keyword sequence corresponding to the current area being less than a twenty-third threshold.

The technical solution as provided in the present invention embodiments may enable the associations between a speech and areas of a presented content, and therefore enable an automatic jump of the presented content according to the areas.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
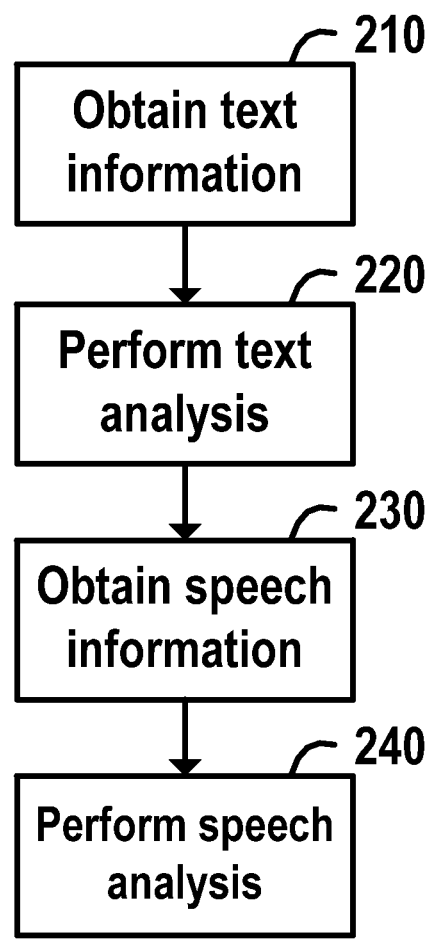
FIG. 2 shows a schematic flow diagram of a data processing method in embodiments of the present invention.

With reference now to FIG. 2, there is shown a data processing method as provided in the embodiments of the present invention. The method comprises the following operations: operation 210, obtaining text information corresponding to a presented content; operation 220, performing text analysis on the text information to obtain a first keyword sequence; operation 230, obtaining speech information related to the presented content; operation 240, using a first model network to perform analysis on a current speech segment to determine an area corresponding to the current speech segment.

According to one embodiment of the present invention, in operation 210, the presented content comprises a plurality of areas. Here, the areas may be partitioned according to different criteria, for example, different subjects, or a fixed size, or pages, paragraphs, etc.; the present invention has no limit thereto. With an example of the presented content being electronic slides for introducing a product, functions of the product may form an area, the structure of the product may form an area, and so on; with an example of the presented content being a document, each paragraph or each first-level title may form an area; with an example of the presented content being pictures, different people in the pictures may form different areas, or each picture forms an area.

Considering an example where the presented content is video or audio, a segment with a fixed duration may form an area, or segments of different subject contents may form different areas. In one embodiment of the present invention, if the presented content is an object mainly comprising texts such as electronic slides, the text information in the presented content may directly act as the text information corresponding to the presented content in operation 210; if the presented content is audio or video, then in operation 210, the text information corresponding to the presented content may be obtained by performing speech recognition on a rehearsal of a presenter, or obtained through subtitles corresponding to the audio or video, or obtained through a manuscript corresponding to the audio or video. Those skilled in the art would appreciate that the area partitioning and text information may be manually adjusted.

Figure 3:
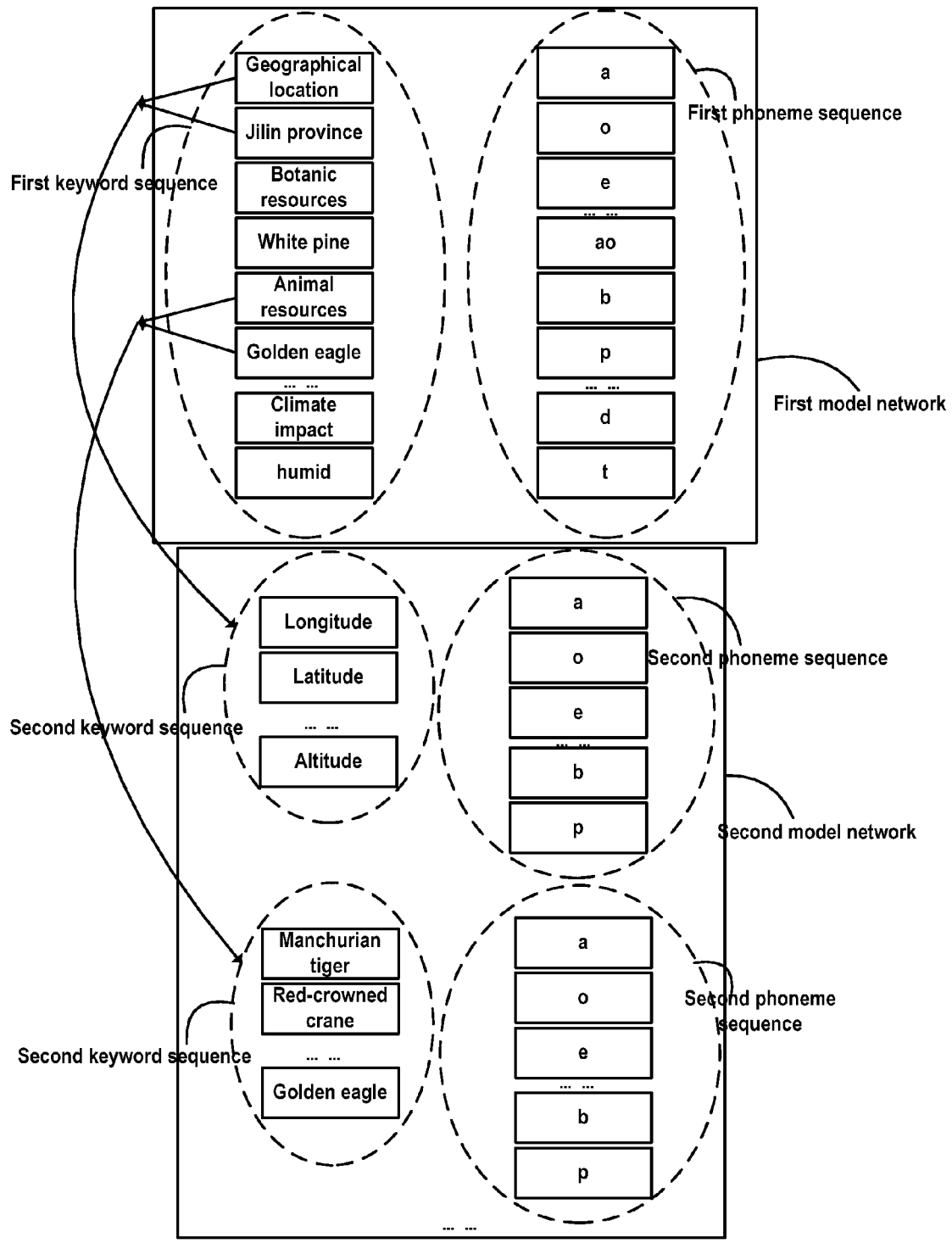
FIG. 3 shows an example of a first model network and a second model network in embodiments of the present invention.

The text analysis in operation 220 may adopt prior art text analysis techniques, which will not be detailed here. The first keyword sequence at operation 220 comprises area keywords associated with the areas of the presented content. The area keywords are the keywords that can identify the areas; the area keywords may be for example titles of all levels, area high frequency words, or control command words, etc. Here, the area high frequency words acting as the area keywords generally will not appear in different areas. Those skilled in the art would appreciate that when using area high frequency words as area keywords, common words will be filtered so as to avoid common words to be taken as area keywords due to their high appearing frequencies. Common words refer to for example conjunctions, pronouns, etc. In one embodiment of the present invention, the area keywords may be manually adjusted or specified, such that the area keywords may be better associated with the areas. Considering an example where a presentation introduces a forest, the presented content comprises a plurality of areas, which comprises a location of the forest, tree species included in the forest, animal resources included in the forest, an adjustment of the forest on surrounding climates, etc. In the example as shown in FIG. 3, the first keyword sequence includes for example: a geographical location, Jilin province, botanical resources, white pine, animal resources, golden eagle, a climate impact, humidity, etc. Here, the two area keywords of the geographical location and Jilin province are both associated with the area of the location of the forest.

Here, the first model network may further comprise a first phoneme sequence. The first phoneme sequence comprises a plurality of phonemes. Those skilled in the art would appreciate that a phoneme is a minimal speech unit, and it refers to for example initials and vowels for Chinese, and refers to for example phonetic symbols for English. In one embodiment of the present invention, the first phoneme sequence comprises all phonemes of a language, for example, all initials and vowels for Chinese.

In operation 230, the speech information at least comprises the current speech segment. The present invention does not specify a segmenting method for speech segments, and may use prior art speech segmenting methods. The speech information related to the presented content is generally an on-site speech of the presenter during the presentation. In one embodiment of the present invention, the speech may be a natural language of the presenter rather than particular command statements as uttered.

In operation 240, a corresponding output can be obtained after using the first model network to analyze the current speech segment. If it is determined that the current speech segment is a certain area keyword in the first keyword sequence, then the output can be the area keyword; if it is determined that the current speech segment is not any area keyword in the first keyword sequence, then the output is a phoneme of the speech segment obtained according to the first phoneme sequence. In one embodiment of the present invention, the above determination can be made based on a contention result between the confidence degrees of the elements included in the first keyword sequence and the first phoneme sequence.

In one embodiment of the present invention, if the output is an area keyword, then it can be determined that the area corresponding to the current speech segment is the area associated with the area keyword.

In one embodiment of the present invention, there is further comprised a jump operation after operation 240: the presented content jumps to the area corresponding to the current speech segment. In this way, an automatic jump of the presented content according to the areas can be enabled, which reduces manual operations. Alternatively, if the area corresponding to the current speech segment is identical to the current area, the jump may not be performed, but still presenting the current area; if the area corresponding to the current speech segment is different from the current area, then the jump is performed so as to display the area corresponding to the current speech segment; at this point, the area corresponding to the current speech segment is the current area. When a specific jump is performed, for a document or electronic slides, the page or paragraph corresponding to the area may be directly jumped to; while for a video or audio and the like, the timestamp corresponding to the area may be directly jumped to. Information of pages, paragraphs or timestamps corresponding to different areas may be preset and may also be obtained through a text analysis.

Those skilled in the art would appreciate that the data processing method as provided in the embodiments of the present invention may not only be applied to the automatic jump of the presented content according to the areas, but also has other applications, for example, for processing the presented content, and performing an operation, such as deleting, moving and the like, on the area corresponding to the current speech segment.

Through the method provided in the above embodiments, the automatic jump of the presented content according to the areas can be implemented based on the language of the presenter, which avoids a manual jump performed by the presenter or other people during the presentation, such that the presentation can be more coherent and smooth, and further needs no cooperation between the presenter and other operators. Further, because the above method may process the natural language of the presenter, which is not limited to command statements, the whole presentation becomes more coherent and natural, and the presenter is not required to memorize particular command statements, thereby reducing the complexity for implementing the method. Particularly, when the presenter performs a remote presentation, only the voice of the presenter can be heard on the site. Through the solution provided in the above embodiments of the present invention, the speech information of the presenter can be analyzed, thereby enabling the automatic jump of the presented content, and avoiding the problem of manipulation of the presented content during the remote presentation.

In one embodiment of the present invention, operation 240 may specifically comprise: obtaining a confidence degree of at least one area keyword in the first keyword sequence, wherein the higher similarity the area keyword has with respect to the current speech segment, the higher confidence degree is obtained for the area keyword; if the confidence degree of the area keyword reaches a threshold, then it is determined that the area corresponding to the current speech segment is the area associated with the area keyword. In another embodiment of the present invention, if all confidence degrees of multiple area keywords associated with a same area reach a threshold, then it is determined that the area corresponding to the current speech segment is the area. Here, the specific numbers of the area keywords, associated the same area, with the confidence degrees reaching a threshold can be preset. In another embodiment of the present invention, if the sum of confidence degrees of multiple area keywords associated with a same area reaches a threshold, then it is determined that the area corresponding to the current speech segment is the area. Here, the sum of the confidence degrees of the multiple area keywords may be a directly added sum or a weighted sum. When using the confidence degrees of the multiple area keywords to perform the determination, an accurate area determination is more facilitated, which reduces the possibility of misjudgment. Those skilled in the art would appreciate that the specific implementations as provide in the above embodiments are merely examples, and the speech analysis can also be performed using the first model network through a combination of the above implementations or through other methods.

In one embodiment of the present invention, the method may be obtaining confidence degrees of all area keywords in the first keyword sequence. When performing the speech analysis, the similarities between the current speech segment and all of the area keywords in the first keyword sequence can be determined, wherein the higher the similarity is, the higher the confidence degree is; an area keyword with the a highest confidence degree is obtained, and then it is determined whether the confidence degree of the area keyword has reached a threshold; if so, then it is determined that the area corresponding to the current speech segment is the area associated with the area keyword. Another implementation may be that the current speech segment is sequentially compared with the area keywords in the first keyword sequence; if the confidence degree of a certain area keyword reaches a threshold, it is directly determined that the area corresponding to the current speech segment is the area associated with the area keyword. Those skilled in the art would appreciate that a similarity between the area keyword and the current speech segment may be a pronunciation similarity, and also a text similarity.

In one embodiment of the present invention, similarities between the current speech segment and phonemes in the first phoneme sequence may be further calculated, wherein a phoneme with a higher similarity has a higher confidence degree, and a phoneme with a highest confidence degree or a phoneme with a confidence degree reaching a threshold is obtained. If the difference between the confidence degrees of the area keyword and the phoneme as obtained according to the above method reaches a threshold, then it is determined that the current speech segment does not include any area keyword.

In one embodiment of the present invention, in operation 240, the area corresponding to the current speech segment may also be determined by using the first phoneme sequence. Specifically, during speech analysis, at least one phoneme adjacent to the current speech segment may be obtained based on the first phoneme sequence; a pronunciation similarity between the at least one phoneme and corresponding text information of the at least one area keyword is determined, the corresponding text information of the at least one area keyword includes a context of the at least one area keyword in the text information; if the pronunciation similarity between the at least one phoneme and the corresponding text information of the at least one area keyword reaches a threshold, then the confidence degree of the area keyword with the pronunciation similarity reaching the threshold is increased. In the embodiments of the present invention, at least one phoneme adjacent to the current speech segment can be obtained regardless of whether the current speech segment includes area keywords, or at least one phoneme adjacent to the current speech segment may be obtained when the current speech segment possibly includes area keywords, for example, the confidence degree of the area keyword is higher than a threshold. Alternatively, in order to more accurately determine the pronunciation similarity between the neighboring phoneme and the context, more neighboring phonemes may be obtained. The area keywords in the first keyword sequence would have their context in the text information, i.e., their corresponding text information; the obtained neighboring phonemes may be compared with the corresponding text information, and the confidence degrees of the corresponding area keywords can be increased when their pronunciation similarities reach a threshold. Those skilled in the art would appreciate that the solution has other implementations. For example, only the corresponding text information with the highest pronunciation similarity is selected, and the confidence degree of the area keyword corresponding to the corresponding text information is increased. Or, the adjustment of the confidence degree varies with different pronunciation similarities; the higher the pronunciation similarity is, the higher the confidence degree is increased. The area determination can be more accurate by adjusting the confidence degree of the area keyword. Further, due to determining a pronunciation similarity instead of a text similarity, this method can also be used to perform a determination even if the presenter has a mispronunciation or accent.

Those skilled in the art would appreciate that in the above embodiments, the illustration has been made with an example where the higher the similarity is, the higher the confidence degree is; however, the confidence degree may be set in a reverse order, i.e., the higher the similarity is, the lower the confidence degree is, and then corresponding determining condition will also be reverse.

In one embodiment of the present invention, not only a one-layer model network can be established through the above method, but also a two-layer model network can be established; through the establishment of the two-layer model network, not only the keywords in the presented content may be determined, but also the accuracy of the area identification may be further improved. FIG. 3 shows an example of a second model network. The establishment of the two-level model network will be described in detail below.

In the embodiment as shown in FIG. 2, the method may further comprise: obtaining a plurality of second keyword sequences, at least one of the second keyword sequences corresponds to at least one area of a plurality of areas and at least one of the second keyword sequences comprises at least one keyword; obtaining a confidence degree of at least one keyword in at least one of the plurality of second keyword sequences based on the plurality of second keyword sequences, wherein the higher similarity a keyword has with respect to the current speech segment, the higher confidence degree is obtained for the keyword. Correspondingly, when determining the area corresponding to the current speech segment, not only the confidence degree of the area keyword, but also the confidence degree of the second keyword sequence corresponding to the current area is determined. Specifically, it is determined whether the confidence degree of the second keyword sequence corresponding to the current area is less than a threshold; if it is so, and if the confidence degree of the area keyword corresponding to the current speech segment satisfies the requirements as described in the above embodiments, then it is determined that the area corresponding to the current speech segment is the area associated with the area keyword meeting the requirements. The confidence degree of the second keyword sequence is obtained based on the confidence degree of the keyword included in the second keyword sequence, for example, an added sum or a weighted sum of the confidence degrees of the included keywords, etc. It can be seen that the accuracy of area determination can be further improved by using the second keyword sequence in the second model network to assist in the area determination.

In one embodiment of the present invention, a second phoneme sequence in the second model network may be used to assist in the area determination. Here, it is required to determine whether the times of obtaining outputs based on the second phoneme sequence reaches a threshold when using the second model network to analyze the speech information; if so and the confidence degree of the area keyword satisfies the requirements as described in the above embodiments, then it is determined that the area corresponding to the current speech segment is the area associated with the area keyword meeting the requirements.

In order to associate the keyword included in the presented content with the current speech segment, in one embodiment of the present invention, the data processing method further comprises: using the second model network to analyze the current speech segment to determine the keywords corresponding to the current speech segment. The above embodiments may be referred to when using the second model network to analyze the speech information. For example, the confidence degree of at least one keyword in the second keyword sequence is obtained, wherein the higher similarity a keyword has with respect to the current speech segment, the higher confidence degree is obtained for the keyword, and the keyword corresponding to the current speech segment is determined based on the confidence degree of the keyword. Through the above method, the keyword in the presented content can be associated based on the speech of the presenter, without a manual mark of the presenter or other people. Alternatively, the present embodiment may also further comprise a mark operation, i.e., marking the keywords corresponding to the current speech segment in the presented content. By automatically marking keywords in the presented content, the presentation coherence is guaranteed and the manpower is saved. For example, when the presenter comes to the area of the geographical location of the forest, when he/she mentions a longitude, the longitude in the presented content may be marked to attract the attention of the audience or viewers. Those skilled in the art would appreciate that the specific technique for marking keywords may adopt prior art techniques and has a varieties of forms, for example, highlighting the keywords, or underlining the keywords, or displaying the keywords in a video content, etc. Moreover, the establishment of the two-layer model network may avoid the problem of too slow speech recognition speed caused by too many keywords, and may also increase the granularity of speech recognition. Those skilled in the art would appreciate that after determining the keywords corresponding to the current speech segment, there may have other application methods, for example, recording the keywords or performing statistics on the keywords, etc.

In the above embodiments, the first keyword sequence is set with respect to areas, while the second keyword sequence includes keywords in each area. It would be appreciated that the second keyword sequence does not necessarily correspond to the areas one by one. For example, some areas may have no corresponding second keyword sequence, while some second keyword sequence may correspond to multiple areas, for example, if the corresponding keywords for multiple areas are the same, then the same second keyword sequence can be used. As mentioned in the previous embodiments, high frequency words that appear in multiple areas generally will not be used as area keywords, but the high frequency words may act as the keywords in the second keyword sequence, because the second keyword sequence is directed to each area. Moreover, the keywords in the second keyword sequence may be manually adjusted and set, for example, a word which the presenter intends to emphasize may also act as a keyword in the second keyword sequence. Generally, the keywords in the second keyword sequence may be high frequency words in that area or other words the presenter intends to mark or emphasize during the presentation.

In one embodiment of the present invention, the second model network may also comprise a second phoneme sequence. The second phoneme sequence may be either identical to or different from the first phoneme sequence. Likewise, the second phoneme sequence is also composed of phonemes. One or more second phoneme sequences may be comprised in the second model network. For example, multiple second keyword sequences correspond to one second phoneme sequence, or each second keyword sequence corresponds one of multiple second phoneme sequences, wherein the multiple second phoneme sequences may be identical or different.

In one embodiment of the present invention, after the area corresponding to the current speech segment is determined through the speech analysis, the current speech segment may be analyzed using the second model network corresponding to the area, thereby enabling the determination of the keywords. In another embodiment of the present invention, the current speech segment may be analyzed by simultaneously using the first model network and the second model network, and when multiple areas comprise a same keyword, which area the keyword belongs to should be determined in conjunction with the determined areas.

In one embodiment of the present invention, the confidence degree of a keyword may also be varied through the second phoneme sequence. For example, at least one phoneme adjacent to the current speech segment may be obtained based on the second phoneme sequence; a pronunciation similarity between the at least one phoneme and corresponding text information of the at least one keyword is determined, and the corresponding text information of the at least one keyword includes a context of the at least one keyword in the text information; if the pronunciation similarity between the at least one phoneme and the corresponding text information of the at least one keyword reaches a threshold, then the confidence degree of the keyword with the pronunciation similarity reaching the threshold is increased.

In one embodiment of the present invention, because a keyword may appear multiple times in the presented content of an area, in order to determine more accurately which keyword should be marked, the second phoneme sequence may be used to assist in determining. Specifically, it may be implemented as: obtaining at least one phoneme adjacent to the current speech segment based on the second phoneme sequence; if the confidence degree of the at least one keyword reaches a first threshold, then determining the keyword with the confidence degree reaching the first threshold to be a candidate keyword; determining a pronunciation similarity between the at least one phoneme and corresponding text information of the candidate keyword, the corresponding text information of the candidate keyword comprising a context of the candidate keyword in the text information; if the pronunciation similarity between the at least one phoneme and one piece of the corresponding text information of the candidate keyword reaches a second threshold, determining that the keyword corresponding to the current speech segment is the keyword of which the context is the text information with the pronunciation similarity reaching the second threshold. In the above operations of the methods, there is no particular execution sequence between obtaining a candidate keyword and obtaining at least one phoneme adjacent to the current speech segment, which can be executed sequentially or simultaneously. For example, when the presenter talks about the animal resources of the forest, a Manchurian tiger appears at two locations in the text information: one location is in "mammal animal resources existing in the forest comprise: a Manchurian tiger, a spotted deer," the other location is in "wherein the first-class protection animals comprises: a Manchurian tiger, a golden eagle." It can be seen that the same keyword appears at the two locations in the same area, and then it is required to determine which is the exact keyword corresponding to the current speech segment through a phoneme adjacent to the current speech segment. By using the second phoneme sequence, the keywords in the text information can be determined more meticulously and accurately.

In one embodiment of the present invention, the second keyword sequence may be obtained while obtaining the first keyword sequence by performing the text analysis on the text information; or the second keyword sequence may be obtained based on the text analysis after obtaining the first keyword sequence.

In one embodiment of the present invention, preset text information may be used as a keyword or a context of an area keyword. In this way, the area and keyword determination will become more flexible. For example, if the presenter performs a rehearsal before the presentation to find identification errors in some areas or keyword misjudgment, the speech information during his/her rehearsal or other text information more conducive to judgment may be taken as the erroneous area keyword or context of the keyword, thereby improving the identification accuracy during the formal presentation.

The above various method embodiments may be combined and referred to each other to obtain more embodiments. Through the methods provided in the above embodiments, an automatic jump of areas can be implemented, and a further mark of keywords in the presented content may also be implemented. Moreover, by using the output of the second phoneme sequence, the keywords required to be marked can be located more accurately; because the output would be derived inherently from the speech analysis, no extra workload will be increased. The second phoneme sequence may also be used to assist in determining whether to perform the area jump. By using the first phoneme sequence, the keyword corresponding to the current speech segment can be determined more accurately, such that the area corresponding to the current speech segment is accurately obtained to perform the area jump. Thus, based on the above embodiments, not only the automation jump and mark of the presented content can be enabled, but also the accuracy of speech recognition can be improved, and meanwhile, the amount of specific computation will not be improved, and no more resources will be consumed.

Thresholds appear in multiple places in the above and following embodiments. These thresholds may be identical or different; the present invention has no specific limitation thereto.

Figure 4:
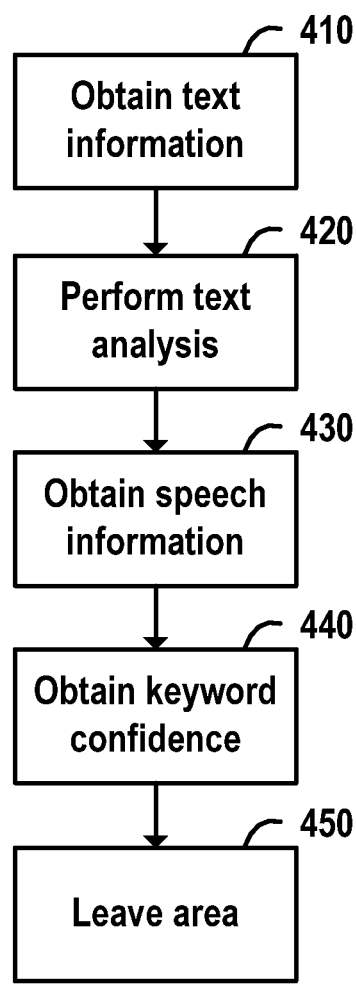
FIG. 4 shows a schematic flow diagram of a presentation method in embodiments of the present invention.

FIG. 4 shows a presentation method according to the embodiments of the present invention. The method comprises: operation 410, obtaining text information corresponding to a presented content, the presented content comprising a plurality of areas; operation 420, performing text analysis on the obtained text information to obtain a plurality of second keyword sequences, wherein at least one of the second keyword sequences corresponds to at least one area of the plurality of areas, and at least one of the second keyword sequences comprises at least one keyword; operation 430, obtaining speech information related to the presented content; operation 440, obtaining confidence degrees of at least a part of keywords in at least a part of second keyword sequences based on the second keyword sequences; operation 450, jumping away from the current area in response to the confidence degree of the second keyword sequence corresponding to the current area being less than a threshold.

In the present embodiment, the specific implementation details may refer to the embodiment as shown in FIG. 2. The difference from the embodiments of FIG. 2 lies in that the area identification in the embodiments of FIG. 2 mainly relies on the determination of the area keyword in the first keyword sequence, while the area identification in the embodiment of FIG. 4 mainly relies on the determination of keywords in the second keyword sequences. It can be seen that because the second keyword sequences correspond to areas, if the confidence degree of a second keyword sequence corresponding to the current area is too low, then it may be determined that the explanation of the presenter has left the current area and entered the next area; thus, an area jump occurs. Through the above method, an automatic area jump for the presented content may be enabled, which saves manpower for manual operations and improves the coherence of the presentation.

In one embodiment, the area jump may also be controlled in conjunction with the area keywords in the first keyword sequence. Specifically, the confidence degree of at least one area keyword in the first keyword sequence may be obtained according to the embodiments of FIG. 2, and when a first condition is met, the area associated with an area keyword involved in the first condition is jumped to. The first condition comprises at least one of the following: a confidence degree of an area keyword reaches a threshold; all confidence degrees of multiple area keywords associated with a same area reach a threshold; a sum of confidence degrees of multiple area keywords associated with a same area reaches a threshold.

In one embodiment of the present invention, the areas can also be confirmed in conjunction with the area keywords in the first keyword sequence. The specific method may refer to the embodiments of FIG. 2.

In one embodiment of the present invention, the area jump may also be controlled based on the confidence degrees of other second keyword sequences. For example, if the confidence degree of a second keyword sequence reaches a threshold, then the area corresponding to the second keyword sequence is jumped to. Because the confidence degree of the second keyword sequence corresponding the current area is already very low, while the confidence degree of another second keyword sequence is relatively high, it may be determined that the current area should be left to jump to the area corresponding to the another second keyword sequence.

In one embodiment of the present invention, keywords in the presented content may be marked. Specifically, if the confidence degree of a keyword reaches a threshold, then it is determined that the keyword corresponding to the current speech segment is the keyword, and therefore the keyword is marked in the presented content.

In one embodiment of the present invention, a confidence degree of a keyword may be changed based on the second phoneme sequence. The specific method may refer to the embodiments of FIG. 2.

The embodiment of FIG. 4 may also have the advantages of a two-layer model network, and its specific implementation may refer to the embodiments of FIG. 2, which will not be detailed here.

Figure 5:
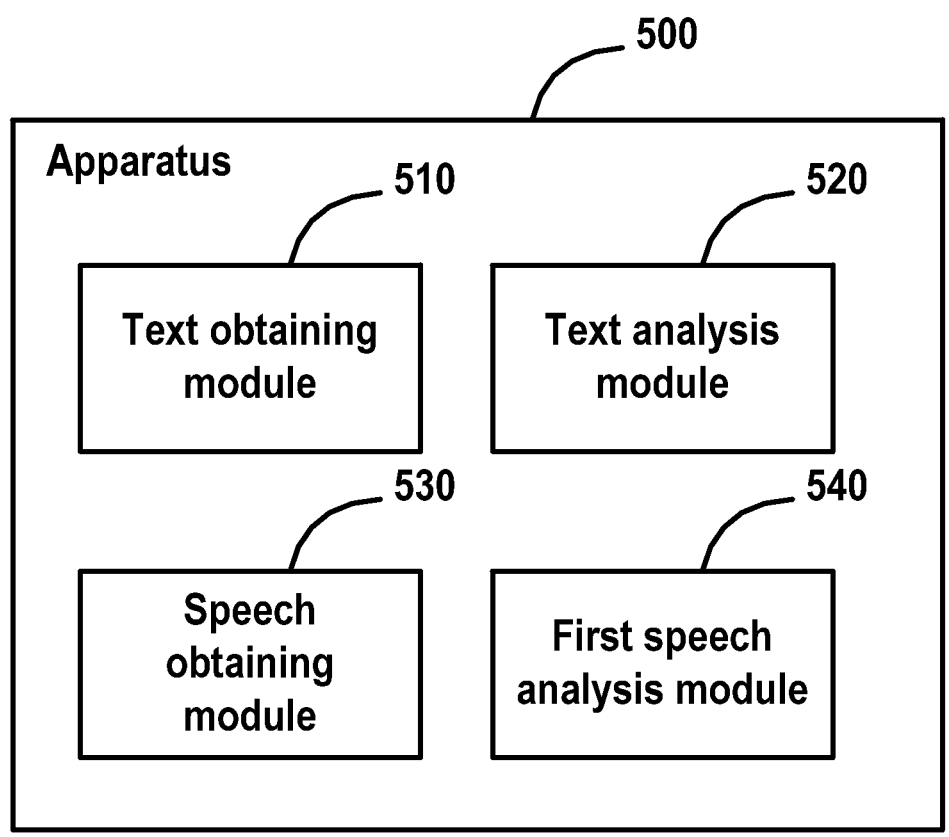
FIG. 5 shows a schematic structural diagram of an apparatus for data processing in embodiments of the present invention.

As shown in FIG. 5, embodiments of the present invention provide an apparatus 500 for data processing. The apparatus 500 comprises: a text obtaining module 510 configured to obtain text information corresponding to a presented content, the presented content comprising a plurality of areas; a text analysis module 520 configured to perform text analysis on the text information to obtain a first keyword sequence, the first keyword sequence comprising area keywords associated with at least one area of the plurality of areas; a speech obtaining module 530 configured to obtain speech information related to the presented content, the speech information at least comprising a current speech segment; a first speech analysis module 540 configured to use a first model network to perform analysis on the current speech segment to determine the area corresponding to the current speech segment, wherein the first model network comprises the first keyword sequence.

According to one embodiment of the present invention, the first speech analysis module 540 comprises: a first confidence submodule configured to obtain a confidence degree of at least one area keyword in the first keyword sequence based on the first keyword sequence, wherein the higher similarity an area keyword has with respect to the current speech segment, the higher confidence degree is obtained for the area keyword; an area determining submodule configured to if a first condition is met, determine that the area corresponding to the current speech segment is an area associated with an area keyword involved in the first condition, wherein the first condition comprises at least one of the following: a confidence degree of an area keyword reaches a threshold; all confidence degrees of multiple area keywords associated with a same area reach a threshold; a sum of confidence degrees of multiple area keywords associated with a same area reaches a threshold.

According to one embodiment of the present invention, the first model network further comprises a first phoneme sequence. The first speech analysis module 540 further comprises a first phoneme submodule configured to obtain at least one phoneme adjacent to the current speech segment based on the first phoneme sequence; a first similarity determining submodule configured to determine a pronunciation similarity between the at least one phoneme and corresponding text information of the at least one area keyword, the corresponding text information of the at least one area keyword includes a context of the at least one area keyword in the text information; a first adjustment submodule configured to if the pronunciation similarity between the at least one phoneme and the corresponding text information of the at least one area keyword reaches a threshold, increase the confidence degree of the area keyword with the pronunciation similarity reaching the threshold.

According to one embodiment of the present invention, the apparatus 500 further comprises: a keyword module configured to obtain a plurality of second keyword sequences, wherein at least one of second keyword sequences corresponds to at least one area of the plurality of areas and at least one of the second keyword sequences comprises at least one keyword; a second speech analysis module configured to use a second model network to perform analysis on the current speech segment to determine a keyword corresponding to the current speech segment, the second model network comprising the second keyword sequences.

In one embodiment of the present invention, the second model network further comprises a second phoneme sequence. Further, the second speech analysis module comprises a second phoneme submodule configured to obtain at least one phoneme adjacent to the current speech segment based on the second phoneme sequence; a second confidence submodule configured to obtain a confidence degree of at least one keyword in the second keyword sequence, wherein the higher similarity a keyword has with respect to the current speech segment, the higher confidence degree is obtained for the keyword; a candidate determining submodule configured to if a confidence degree of at least one keyword reaches a fifth threshold, determine the keyword with the confidence degree reaching the fifth threshold to be a candidate keyword; a second similarity determining submodule configured to determine a pronunciation similarity between the at least one phoneme and the corresponding text information of the candidate keyword, the text information of the determined keyword comprising a context of the candidate keyword in the text information; a keyword determining submodule configured to if the pronunciation similarity between the at least one phoneme and one piece of the corresponding text information of the candidate keyword reaches a sixth threshold, determine the keyword corresponding to the current speech segment to be the keyword of which the context is the text information with the pronunciation similarity reaching the sixth threshold.

In one embodiment of the present invention, the apparatus 500 may further comprise a jump module and/or a mark module. The jump module is configured to enable the presented content to jump to the area corresponding to the current speech information. The mark module is configured to mark in the presented content a keyword corresponding to the current speech information.

In one embodiment of the present invention, the apparatus 500 may also comprise other modules configured to perform other operations in the embodiments of FIG. 2, referring to the embodiments of FIG. 2 for details, which will not be detailed here. Further, the technical effects resulting from the modules comprised in the apparatus 500 and the relationships between the modules may refer to the embodiments of FIG. 2.

The embodiments as shown in FIG. 5 may be combined and referred to each other to obtain more embodiments.

Figure 6:
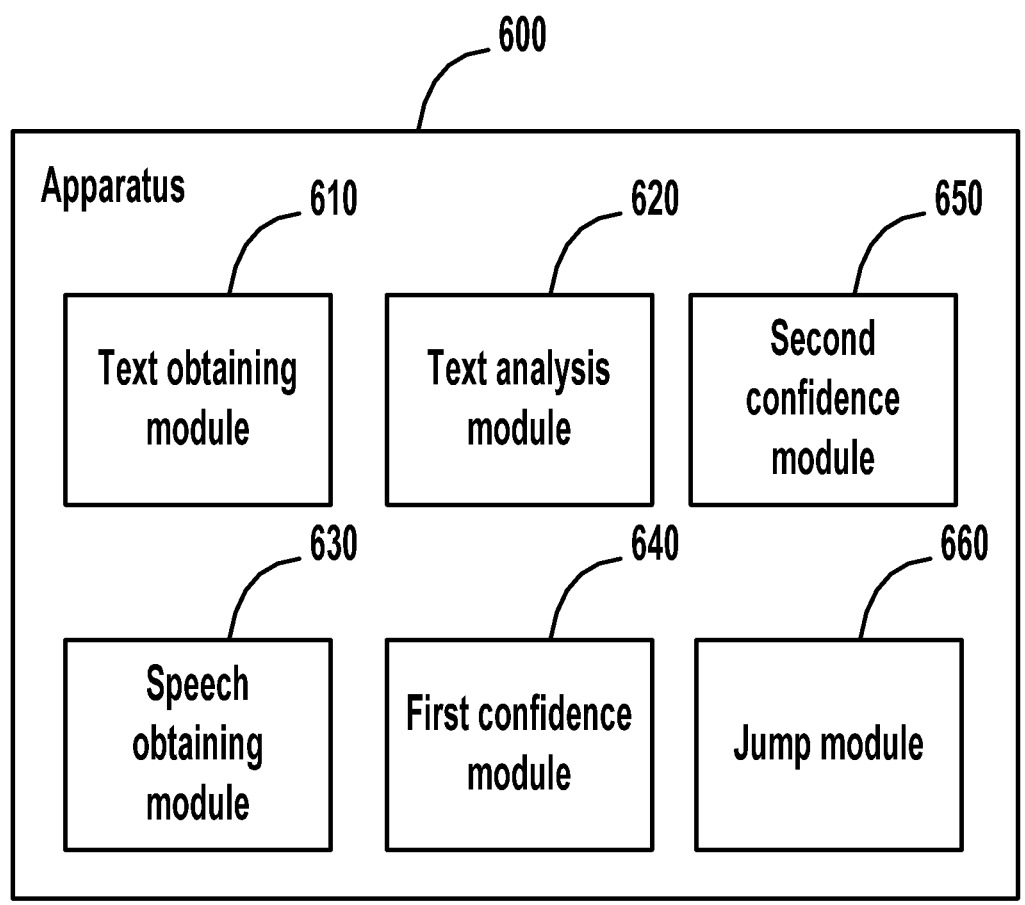
FIG. 6 shows a schematic structural diagram of an apparatus for presentation in embodiments of the present invention.

As shown in FIG. 6, embodiments of the present invention provide an apparatus 600 for presentation. The apparatus 600 comprises: a text obtaining module 610 configured to obtain text information corresponding to a presented content, wherein the presented content comprises a plurality of areas; a text analysis module 620 configured to perform text analysis on the text information to obtain a plurality of second keyword sequences, wherein at least one of the second keyword sequences corresponds to at least one area of the plurality of areas, and at least one of the second keyword sequences comprises at least one keyword; a speech obtaining module 630 configured to obtain speech information related to the presented content, the speech information at least comprising a current speech segment; a first confidence module 640 configured to obtain a confidence degree of at least one keyword in at least one of the second keyword sequences, wherein the higher similarity a keyword has with respect to the current speech segment, the higher confidence degree is obtained for the keyword; a second confidence module 650 configured to obtain a confidence degree of the second keyword sequence corresponding to the current area based on the confidence degree of the keyword; a jump module 660 configured to jump away from the current area in response to the confidence degree of the second keyword sequence corresponding to the current area being less than a threshold.

In one embodiment of the present invention, the apparatus 600 further comprises: an area keyword module configured to obtain a first keyword sequence, the first keyword sequence comprising an area keyword associated with at least one area of the plurality of areas; a third confidence module configured to obtain a confidence degree of at least one area keyword in the first keyword sequence, wherein the higher similarity an area keyword has with respect to the current speech segment, the higher confidence degree is obtained for the area keyword. Further, the jump module 660 is specifically configured to if a third condition is met, jump to an area associated with an area keyword involved in the third condition, wherein the third condition comprises at least one of the following: a confidence degree of an area keyword reaches a threshold; all confidence degrees of multiple area keywords associated with a same area reach a threshold; a sum of confidence degrees of multiple area keywords associated with a same area reaches a threshold.

In one embodiment of the present invention, the jump module 660 is specifically configured to if a second condition is met, jump to an area corresponding to a second keyword sequence involved in the second condition, wherein the second condition comprises: the confidence degree of the second keyword sequence reaches a threshold.

In one embodiment of the present invention, the apparatus 600 further comprises a determining module configured to, if a confidence degree of a keyword reaches a threshold, determine that the keyword corresponding to the current speech segment is the keyword; a mark module configured to mark the keyword in the presented content.

In one embodiment of the present invention, the apparatus 600 further comprises a phoneme module configured to obtain at least one phoneme adjacent to the current speech segment based on the second phoneme sequence; a similarity determining module configured to determine a pronunciation similarity between the at least one phoneme and corresponding text information of the at least one keyword, the corresponding text information of the at least one keyword comprising a context of the at least one keyword in the text information; a confidence degree adjustment module configured to if the pronunciation similarity between the at least one phoneme and the corresponding text information of the at least one keyword reaches a threshold, increase the confidence degree of the keyword with the pronunciation similarity reaching a threshold.

Various embodiments as shown in FIG. 6 may be combined and referred to each other to obtain more embodiments. Further, the implementation details in the above apparatus embodiments may refer to the embodiments of FIG. 4.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for data processing to perform text and speech analysis of a presentation, the apparatus comprising:
    a processor coupled to a system bus and operable to access one or more of a serial interface controller and a parallel interface controller, the processor operable to execute instructions to perform a method comprising:
    obtaining, by the processor, text information corresponding to a presented content, the presented content comprising a plurality of areas, each of the areas comprising a segment of the presented content partitioned according to one or more criteria;
    performing text analysis, by the processor, on the text information to obtain a first keyword sequence, the first keyword sequence including area keywords associated with at least one area of the plurality of areas;
    obtaining speech information related to the presented content, the speech information at least comprising a current speech segment of a presenter during a presentation and the speech information is obtained by the processor over the system bus from one or more of the serial interface controller or the parallel interface controller as audio or video of the presenter during the presentation;
    using a first model network to perform analysis on the current speech segment by the processor to determine the area corresponding to the current speech segment, wherein the first model network comprises the first keyword sequence;
    obtaining a plurality of second keyword sequences by the processor, at least one of the second keyword sequences corresponding to at least one area of the plurality of areas and at least one of the second keyword sequences comprising at least one keyword;
    using a second model network to perform analysis on the current speech segment by the processor to determine a keyword corresponding to the current speech segment, the second model network comprising the second keyword sequences; and
    marking the presented content, by the processor, to attract audience attention based on determining the keyword corresponding to the current speech segment.

2. The apparatus according to claim 1, wherein the using a first model network to perform analysis on the current speech segment to determine the area corresponding to the current speech segment comprises:
    obtaining a confidence degree of at least one area keyword in the first keyword sequence, wherein the higher similarity an area keyword has with respect to the current speech segment, the higher confidence degree is obtained for the area keyword;
    determining, if a first condition is met, that the area corresponding to the current speech segment is an area associated with an area keyword involved in the first condition;
    wherein the first condition comprises at least one of the following:
    that a confidence degree of an area keyword reaches a first threshold;
    that all confidence degrees of multiple area keywords associated with a same area reach a second threshold;
    that a sum of confidence degrees of multiple area keywords associated with a same area reaches a third threshold.

3. The apparatus according to claim 2,
    wherein the first model network further comprises a first phoneme sequence;
    wherein the using a first model network to perform analysis on the current speech segment to determine the area corresponding to the current speech segment further comprises:
    obtaining at least one phoneme adjacent to the current speech segment based on the first phoneme sequence;
    determining a pronunciation similarity between the at least one phoneme and corresponding text information of the at least one area keyword, the corresponding text information of the at least one area keyword comprising a context of the at least one area keyword in the text information;
    if the pronunciation similarity between the at least one phoneme and the corresponding text information of the at least one area keyword reaches a fourth threshold, raising the confidence degree of the area keyword with the pronunciation similarity reaching the fourth threshold.

4. The apparatus according to claim 2, wherein the processor is operable to execute instructions to perform the method further comprising:
    obtaining a plurality of second keyword sequences, at least one of the second keyword sequences corresponding to at least one area of the plurality of areas and at least one of the second keyword sequence comprising at least one keyword; obtaining a confidence degree of at least one keyword in at least one of the second keyword sequences, wherein a keyword having a higher similarity with the current speech segment has a higher confidence degree;
    the determining, if a first condition is met, that the area corresponding to the current speech segment is an area associated with an area keyword involved in the first condition comprises: if the first condition is met and a second condition also is met, determining that the area corresponding to the current speech segment is the area associated with the area keyword involved in the first condition, and taking the area corresponding to the current speech segment as the current area;
    wherein the second condition comprises that a confidence degree of a second keyword sequence corresponding to the current area is less than a fifth threshold, the confidence degree of the second keyword sequence corresponding to the current area being obtained based on a confidence degree of a keyword included in the second keyword sequence corresponding to the current area.

5. The apparatus according to claim 2, the processor is operable to execute instructions to perform the method further comprising:
obtaining a plurality of second keyword sequences, at least one of the second keyword sequences corresponding to at least one area of the plurality of areas and at least one of the second keyword sequences comprising at least one keyword; using a second model network to perform analysis on the speech segment, the second model network comprising the second keyword sequences and a second phoneme sequence;
the determining, if a first condition is met, that the area corresponding to the current speech segment is an area associated with an area keyword involved in the first condition comprises: if the first condition is met and a third condition also is met, determining that the area corresponding to the current speech segment is the area associated with the area keyword involved in the first condition;
wherein the third condition comprises that when using the second model network to perform the analysis on the current speech segment, the times of obtaining outputs based on the second phoneme sequence reaches a sixth threshold.

6. The apparatus according to claim 1, wherein using the second model network to perform analysis on the current speech segment to determine a keyword corresponding to the current speech segment is performed simultaneous with the analysis of the first model network.

7. The apparatus according to claim 1, wherein the second model network further comprises a second phoneme sequence;
wherein the using a second model network to perform analysis on the current speech segment to determine a keyword corresponding to the current speech segment comprises:
obtaining at least one phoneme adjacent to the current speech segment based on the second phoneme sequence;
determining a pronunciation similarity between the at least one phoneme and corresponding text information of the at least one keyword, the corresponding text information of the at least one keyword comprising a context of the at least one keyword in the text information; and
if the pronunciation similarity between the at least one phoneme and the corresponding text information of the at least one keyword reaches a threshold, increasing the confidence degree of the keyword with the pronunciation similarity reaching the threshold.

8. The apparatus according to claim 1, wherein the second model network further comprises a second phoneme sequence, and the processor is operable to execute instructions to perform the method further comprising:
obtaining at least one phoneme adjacent to the current speech segment based on the second phoneme sequence; and
determining a pronunciation similarity between the at least one phoneme and corresponding text information of the candidate keyword, the corresponding text information of the candidate keyword comprising a context of the candidate keyword in the text information.

9. An apparatus to automatically jump to a different area of a presentation based on text and speech analysis, the apparatus comprising:
a processor coupled to a system bus and operable to access one or more of a serial interface controller and a parallel interface controller, the processor operable to execute instructions to perform a method comprising:
obtaining, by the processor, text information corresponding to a presented content, the presented content comprising a plurality of areas, each of the areas comprising a segment of the presented content partitioned according to one or more criteria;
performing text analysis, by the processor, on the text information to obtain a first keyword sequence, the first keyword sequence comprising an area keyword associated with at least one area of the plurality of areas and obtain a plurality of second keyword sequences, at least one of the second keyword sequences corresponding to at least one area of the plurality of areas and at least one of the second keyword sequences comprising at least one keyword;
obtaining speech information related to the presented content, the speech information at least comprising a current speech segment of a presenter during a presentation and the speech information is by the processor over the system bus from one or more of the serial interface controller or the parallel interface controller as audio or video of the presenter during the presentation;
obtaining a confidence degree of at least one keyword in at least one of the keyword sequences, wherein the higher similarity a keyword has with the current speech segment, the higher confidence degree is obtained for the keyword;
obtaining the confidence degree of the second keyword sequence corresponding to a current area of the plurality of areas based on the confidence degree of the keyword; and
jumping away from the current area of the presented content by the processor in response to the confidence degree of the second keyword sequence corresponding to the current area being less than a threshold.

10. The apparatus according to claim 9, the processor is operable to execute instructions to perform the method further comprising:
obtaining a confidence degree of at least one area keyword in the first keyword sequence based on the first keyword sequence, wherein the higher similarity an area keyword has with respect to the current speech segment, the higher confidence degree is obtained for the area keyword.

* * * * *